(12) United States Patent
Ostrem et al.

(10) Patent No.: US 8,903,092 B2
(45) Date of Patent: Dec. 2, 2014

(54) HIGH SPEED DIGITAL TO ANALOG CONVERTER WITH REDUCED SPURIOUS OUTPUTS

(75) Inventors: Geir Sigurd Ostrem, Colorado Springs, CO (US); Brian Paul Brandt, Windham, NH (US)

(73) Assignee: Maxim Integrated Products, Inc., San Jose, CA (US)

( * ) Notice: Subject to any disclaimer, the term of this patent is extended or adjusted under 35 U.S.C. 154(b) by 803 days.

(21) Appl. No.: 12/794,323

(22) Filed: Jun. 4, 2010

(65) Prior Publication Data

US 2011/0299688 A1 Dec. 8, 2011

(51) Int. Cl.
H04L 29/06 (2006.01)
H04K 1/00 (2006.01)
H04L 9/06 (2006.01)

(52) U.S. Cl.
CPC . *H04L 9/065* (2013.01); *H04K 1/00* (2013.01)
USPC ........... 380/268; 380/255; 341/110; 341/126; 341/144; 341/155

(58) Field of Classification Search
CPC ..................................................... H04L 9/065
USPC ........... 380/268, 255; 341/110, 126, 144, 155
See application file for complete search history.

(56) References Cited

U.S. PATENT DOCUMENTS

| | | | |
|---|---|---|---|
| 7,123,718 B1 * | 10/2006 | Moskowitz et al. | 380/205 |
| 7,664,264 B2 * | 2/2010 | Moskowitz et al. | 380/210 |
| 8,160,249 B2 * | 4/2012 | Moskowitz et al. | 380/205 |
| 2001/0021199 A1 * | 9/2001 | Lee et al. | 370/503 |
| 2001/0038422 A1 * | 11/2001 | Yamada et al. | 348/478 |
| 2001/0043417 A1 * | 11/2001 | Watanabe et al. | 360/51 |
| 2002/0027609 A1 * | 3/2002 | Oku et al. | 348/441 |
| 2002/0048366 A1 * | 4/2002 | Moriyama | 380/201 |
| 2002/0066099 A1 * | 5/2002 | Ohno | 725/39 |
| 2002/0067811 A1 * | 6/2002 | Matsumoto | 379/93.08 |
| 2002/0075943 A1 * | 6/2002 | Kurihara | 375/146 |
| 2002/0114348 A1 * | 8/2002 | McCrosky et al. | 370/465 |
| 2002/0126351 A1 * | 9/2002 | Chung et al. | 359/124 |
| 2002/0140572 A1 * | 10/2002 | Gardner et al. | 340/853.3 |
| 2002/0181569 A1 * | 12/2002 | Goldstein et al. | 375/222 |

(Continued)

OTHER PUBLICATIONS

Quevedo et al.; Multistep optimal analog-to-digital conversion; Published in: Circuits and Systems I: Regular Papers, IEEE Transactions on (vol. 52 , Issue: 3 ); Date of Publication: Mar. 2005; pp. 503-515; IEEE Xplore.*

(Continued)

*Primary Examiner* — Bradley Holder

(57) ABSTRACT

A system includes a first circuit including a scrambling module that receives N digital data streams and that scrambles the N digital data streams using a scrambling sequence. A data bus receives the N scrambled digital data streams and the scrambling sequence. A second circuit communicates with the data bus and includes a first processing module that processes the N scrambled digital data streams and that outputs M digital data streams, where M and N are integers greater than one. The second circuit includes one or more descrambling and processing modules that receive the M digital data streams, that descramble the M digital data streams based on the scrambling sequence, and that further process the M digital data streams. The second circuit includes a digital to analog converter (DAC) module that receives an output of the one or more descrambling and processing modules.

12 Claims, 5 Drawing Sheets

(56) References Cited

U.S. PATENT DOCUMENTS

| | | | |
|---|---|---|---|
| 2003/0014565 A1* | 1/2003 | Kawamura et al. | 710/1 |
| 2003/0067552 A1* | 4/2003 | Leyvi et al. | 348/453 |
| 2003/0137440 A1* | 7/2003 | Ranganathan et al. | 341/155 |
| 2003/0151528 A1* | 8/2003 | Adams et al. | 341/50 |
| 2003/0197633 A1* | 10/2003 | Adams et al. | 341/144 |
| 2003/0210734 A1* | 11/2003 | Kaku | 375/148 |
| 2004/0028234 A1* | 2/2004 | Wuidart | 380/287 |
| 2005/0036562 A1* | 2/2005 | Ranganathan et al. | 375/257 |
| 2005/0047512 A1* | 3/2005 | Neff et al. | 375/259 |
| 2007/0036173 A1* | 2/2007 | McCrosky et al. | 370/463 |
| 2007/0064940 A1* | 3/2007 | Moskowitz et al. | 380/205 |
| 2009/0067625 A1* | 3/2009 | Patel et al. | 380/201 |
| 2010/0153734 A1* | 6/2010 | Moskowitz et al. | 713/179 |

OTHER PUBLICATIONS

Liebhold et al.; Toward an open environment for digital video; Published in: Magazine Communications of the ACM—Special issue on digital multimedia systems CACM Homepage archive vol. 34 Issue 4, Apr. 1991; pp. 103-112; ACM Digital Library.*

Schematic, *Data Conversion Systems*, Feb. 27, 1995, Drawing No. OL-CD-D0002-S20.2; File No. 5Z0COZ.

Harris, Steven, et al, "Techniques to Measure and Maximize the Performance of a 120 dB, 24-bit, 96 kHz A/D Converter Integrated Circuit", Crystal Semiconductor Corporation, Austin, TX, USA, 21 pages.

* cited by examiner

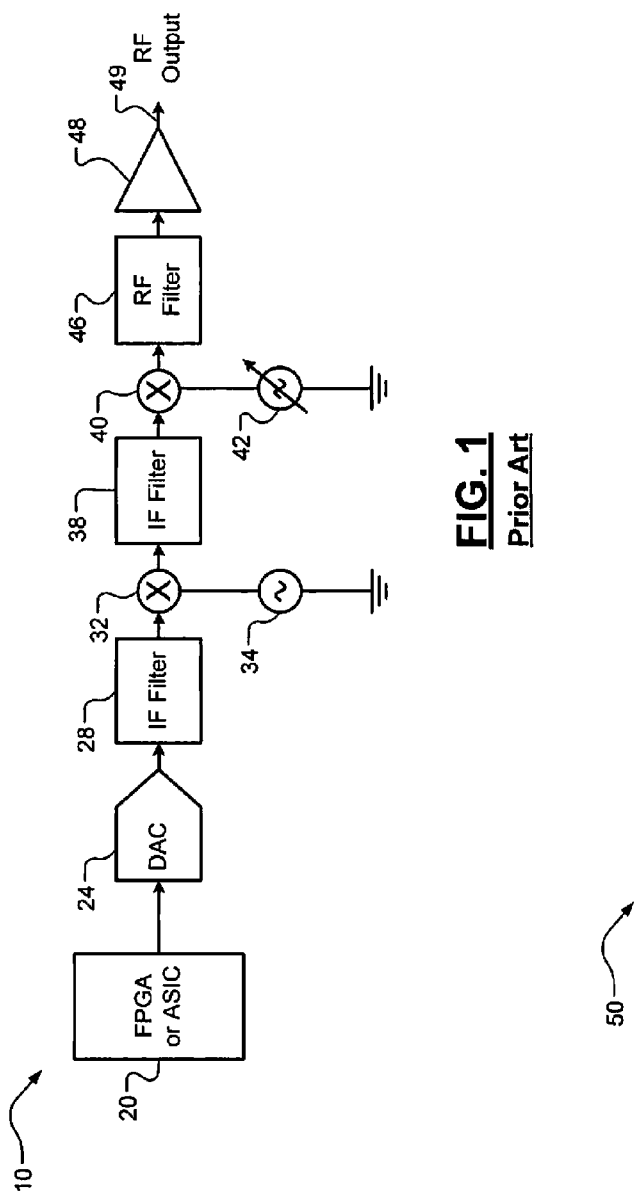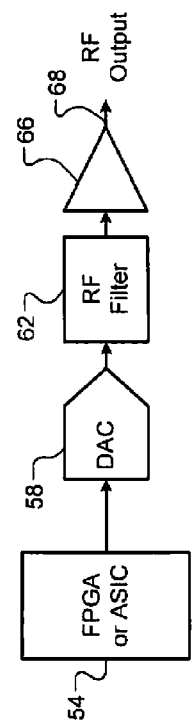

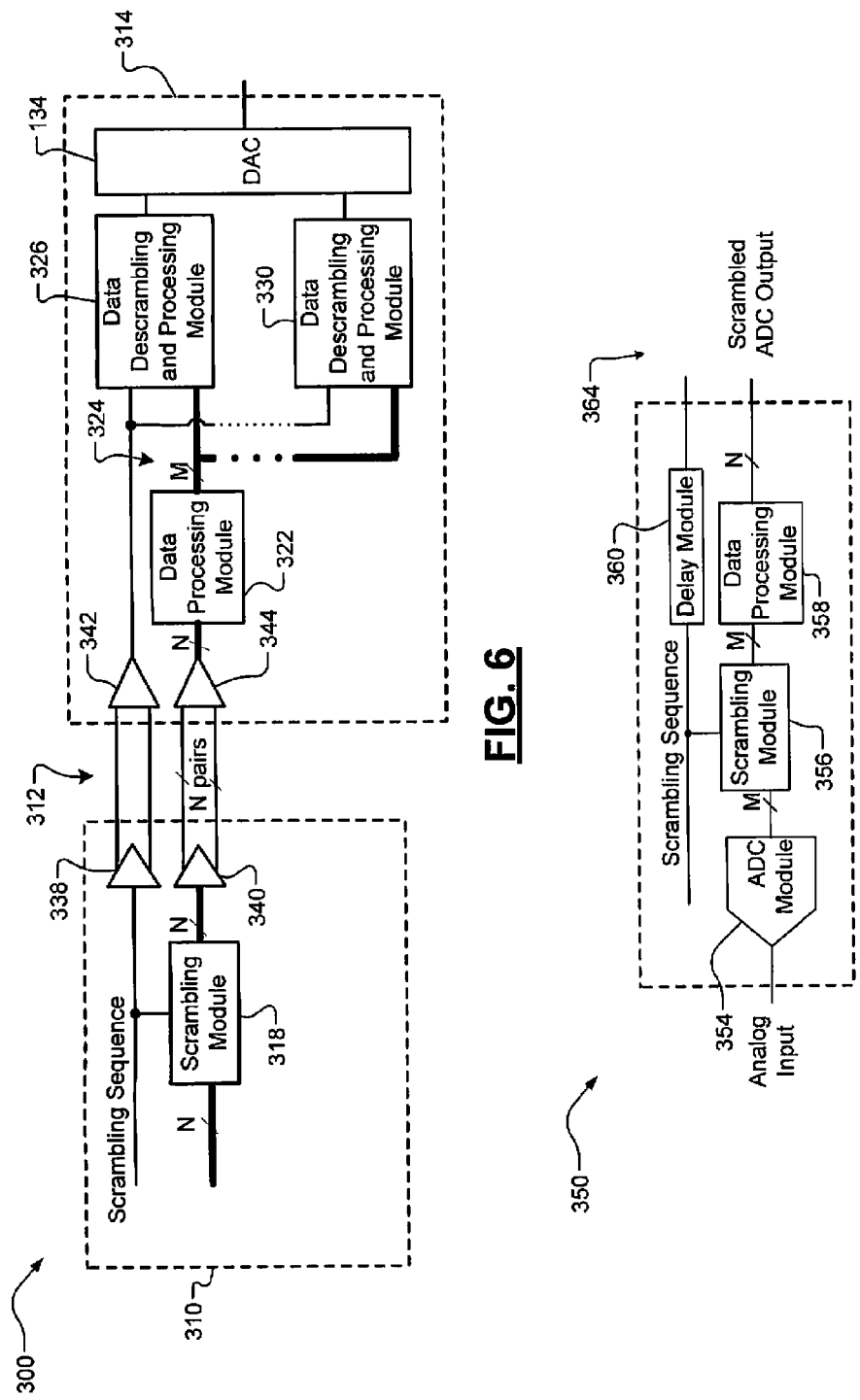

ical to analog converters and analog to digital converters. -->

HIGH SPEED DIGITAL TO ANALOG CONVERTER WITH REDUCED SPURIOUS OUTPUTS

FIELD

The present disclosure relates to digital to analog converters and analog to digital converters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Digital to analog converters (DACs) convert a digital signal to an analog signal. Analog to digital converters (ADCs) convert an analog signal to a digital signal. For example only, some audio signals are stored in digital form (for example MP3s and CDs). The digital signals must be converted into analog signals in order to be heard through speakers. Video signals from a digital source must be converted to analog signals if they are to be displayed on an analog monitor.

Referring now to FIG. 1, a heterodyne modulating system 10 for generating a digitally-modulated carrier is shown. For example only, the system 10 may be used in a cable television system or another system. The system 10 includes a circuit 20 such as a field programmable gate array (FPGA), application specific integrated circuit (ASIC) or other circuit. Digital signals are output by the circuit 20 to a digital to analog converter (DAC) 24, which converts the digital signals to analog signals.

The analog signals output by the DAC 24 are input to an intermediate frequency (IF) filter 28, which may perform filtering such as bandpass filtering in a first frequency range. An output of the IF filter 28 is input to a mixer 32 that also receives a signal from a local oscillator (LO) 34. An output of the mixer 32 is input to an IF filter 38, which performs filtering such as bandpass filtering in a second frequency range. An output of the IF filter 38 is input to a mixer 40, which also receives a signal from a variable LO 42. An output of the mixer 40 is input to a radio frequency (RF) filter 46. An output of the RF filter 46 is amplified and output to a buffer/amplifier 48. An output of the buffer amplifier 48 generates the RF output signal at 49.

Digital modulation such as quadrature amplitude modulation (QAM) may be performed by the circuit 20 in the digital domain. The digital modulated carrier signal is converted to an analog carrier signal by the DAC 24. The IF filter 28 removes an image and other spurious content from the output of the DAC 24.

One or more frequency conversions are performed to convert the analog carrier frequency to a signal at a desired channel frequency. In FIG. 1, a low intermediate frequency (IF) signal produced by the DAC 24 is up-converted to a high IF signal. The high IF signal is filtered by the second IF filter 38. The high IF signal is then converted to an RF carrier signal by the mixer 40 and the variable LO 42. The output of the mixer 40 is filtered by the IF filter 46, which passes the entire cable band. The buffer/amplifier 48 provides the final RF output.

With the availability of high-speed, high-performance DACs, it is possible to directly produce the desired RF output signal. Referring now to FIG. 2, a direct modulating system 50 that directly produces the desired RF output signal is shown. In the direct RF approach, a DAC 58 receives the output of a circuit 54 such as a FPGA, ASIC or other circuit and produces the RF carrier signal directly at a final RF frequency. There is minimal filtering between the output of the DAC 58 and the RF output signal at 68. In FIG. 2, the output of the DAC 58 is filtered by an RF filter 62 and amplified by a buffer/amplifier 66. The buffer/amplifier 66 outputs the RF output signal at 68.

While having many advantages, the direct approach has increased exposure to DAC spurious outputs. In the system 10 of FIG. 1, the IF filters 28 and 38 limit bandwidth of the output signal of the DAC 24 and thus reduce a contribution of the DAC 24 to the overall spurious outputs of the system. In the system 50 of FIG. 2, there is minimal filtering between the DAC 24 and the RF output signal at 68. Any spurious signals at the output of the DAC 24 will be passed directly to a system receiving the RF output signal.

SUMMARY

A system includes a first circuit including a scrambling module that receives N digital data streams and that scrambles the N digital data streams using a scrambling sequence. A data bus receives the N scrambled digital data streams and the scrambling sequence. A second circuit communicates with the data bus and includes a first processing module that processes the N scrambled digital data streams and that outputs M digital data streams, where M and N are integers greater than one. The second circuit includes one or more descrambling and processing modules that receive the M digital data streams, that descramble the M digital data streams based on the scrambling sequence and that further process the M digital data streams. The second circuit includes a digital to analog converter (DAC) module that receives an output of the one or more descrambling and processing modules.

In other features, the first circuit comprises one of a field programmable gate array (FPGA) and an application specific integrated circuit (ASIC). The second circuit comprises an integrated circuit. The first circuit further comprises a demultiplexer that outputs the N digital data streams to the scrambling module. The first processing module of the second circuit comprises a multiplexer. The one or more descrambling and processing modules perform thermometer decoding. The scrambling module comprises a plurality of XOR logic gates.

In other features, first drivers receive the N scrambled digital data streams and output N pairs of differential signals to the data bus. First receivers receive the N pairs of differential signals from the data bus and output the N scrambled digital data streams to the first processing module. A second driver receives the scrambling sequence and outputs second differential signals to the data bus. A second receiver receives the second differential signals from the data bus and outputs the scrambling sequence to the one or more descrambling and processing modules.

In other features, the differential signals comprise one of low voltage differential signals (LVDS), Pseudo (or Positive) Emitter Coupled Logic (PECL) signals, and differential high speed transceiver logic (HSTL) signals.

A method includes scrambling N digital data streams using a scrambling sequence in a first circuit; transferring the N scrambled digital data streams and the scrambling sequence over a data bus to a second circuit; processing the N scrambled digital data streams in the second circuit using a first processing module to generate M digital data streams, where M and N are integers greater than one; further descrambling and processing the output of the first processing module at the second circuit using one or more descrambling and processing modules; and performing digital to analog conversion on an output of the one or more descrambling and processing modules.

In other features, the first circuit comprises one of a field programmable gate array (FPGA) and an application specific integrated circuit (ASIC). The second circuit comprises an integrated circuit. The method further includes converting the scrambling sequence and the N scrambled digital data streams into N+1 pairs of differential signals using the first circuit; transmitting the N+1 pairs of differential signals over the data bus; and converting the N+1 pairs of differential signals to the N scrambled digital data streams and the scrambling sequence.

In other features, the differential signals comprise one of low voltage differential signals (LVDS), Pseudo (or Positive) Emitter Coupled Logic (PECL) signals, and differential high speed transceiver logic (HSTL) signals.

A system includes a first circuit including an analog to digital converter module that receives an analog input and that outputs M digital data streams, a scrambling module that receives the M digital data streams and that scrambles the M digital data streams using a scrambling sequence, and a first processing module that receives the scrambled M digital data streams and that outputs N digital data streams, where N and M are integers greater than one. A data bus receives the N digital data streams. A second circuit comprises a second processing module that receives the N digital data streams and that processes the N digital data streams and one or more descrambling and processing modules that receive an output of the first processing module, that descramble the output of the second processing module based on the scrambling sequence and that further process the output of the second processing module.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of an RF modulating system according to the prior art;

FIG. 2 is a functional block diagram of a direct modulating system according to the prior art;

FIG. 6 is a functional block diagram of another digital to analog converter according to the present disclosure; and FIG. 7 is a functional block diagram of an exemplary analog to digital converter according to the present disclosure.

DETAILED DESCRIPTION

Figure 3:
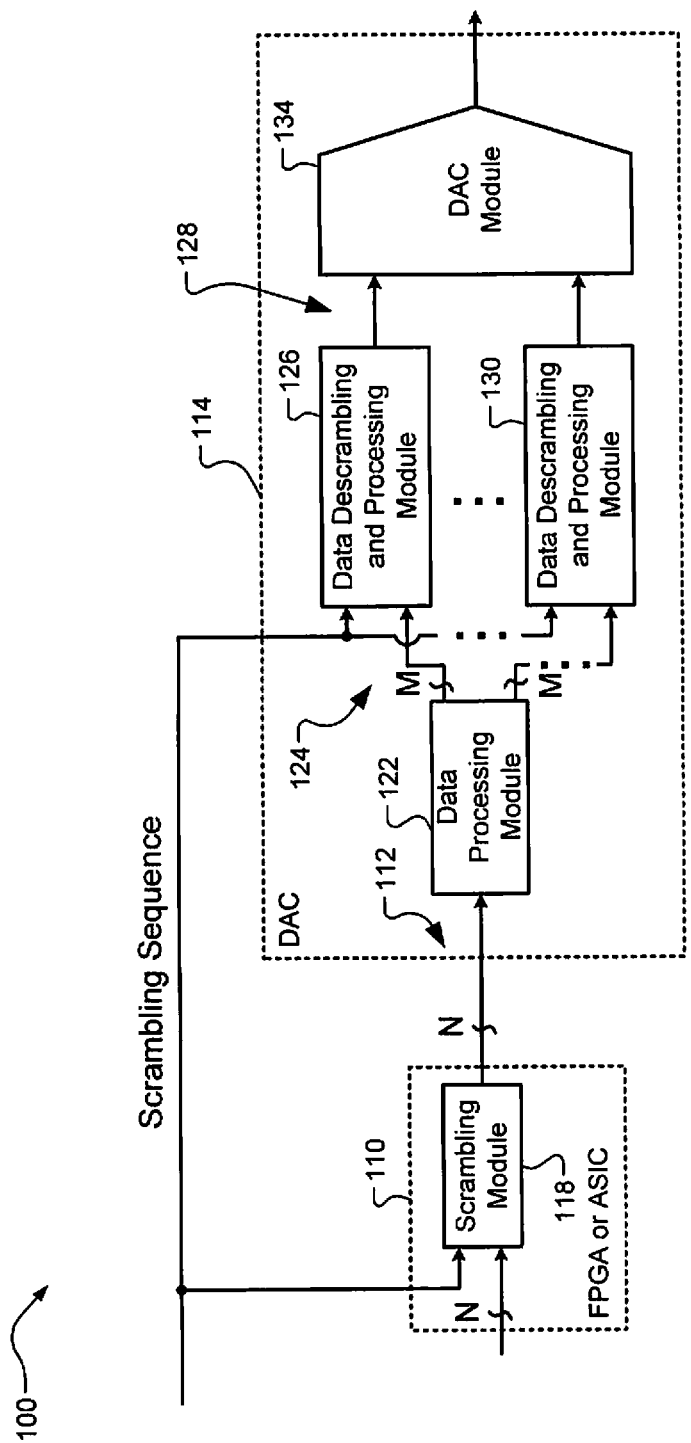
FIG. 3 is a functional block diagram of an exemplary digital to analog converter according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In some applications, data buses connect the circuit providing the digital data (such as the FPGA or ASIC) to another circuit (such as an integrated circuit) including the DAC. Coupling from the signal lines of the data bus into sensitive analog lines is one possible source of spurious outputs. The data bus may carry signals that are correlated with the desired output signal. The present disclosure uses data scrambling to de-correlate signals on data buses from the desired output. The scrambling is maintained through one more data processing modules of the DAC.

Figure 4:
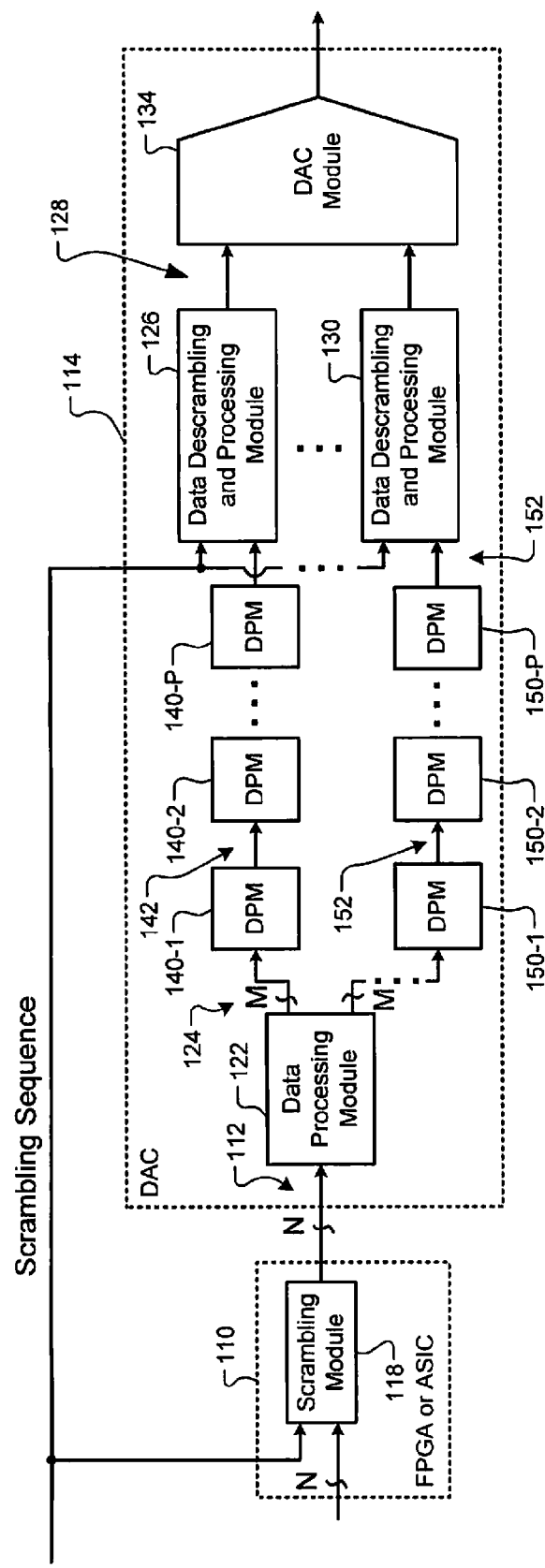
FIG. 4 is a functional block diagram of another exemplary digital to analog converter according to the present disclosure.

Referring now to FIGS. 3 and 4, a system 100 includes a circuit 110 such as a FPGA, ASIC or other circuit connected by a data bus 112 to a DAC 114. In some implementations, the circuit 110 and the DAC 114 are separate integrated circuits. N parallel data streams are each scrambled by a scrambling module 118 associated with the circuit 110. The scrambling module 118 may perform scrambling based on a scrambling sequence. For example only, the scrambling module 118 can include N exclusive OR (XOR) logic gates that scramble the N parallel data streams and the scrambling sequence, although other types of scrambling may be performed. The scrambling module 118 de-correlates the signals on the data bus 112 from a desired output signal to reduce spurious outputs.

The N scrambled parallel data streams are transferred by the data bus 112 to the DAC 114 where they are processed by a first data processing module 122. A data bus 124 is connected to an output of the first data processing module 122 and includes M parallel data streams. Data on the data bus 124 remains scrambled. M may be an integer equal to or different than the input bus width N. The scrambling is maintained on one or more internal data buses of the DAC 114 and may be received by zero (FIG. 3) or more additional processing modules (for example, see FIG. 4). The data is received at data processing modules 126 and 130 that process and descramble the data as it is used. The descrambling and processing can be done in any order. Outputs of the data processing modules 126 and 130 are input to a DAC module 134.

In FIG. 4, the data bus output 124 of the data processing module 122 is received by one or more data processing (DP) modules 140-1, 140-2, . . . , and 140-P (collectively DPMs 140). A data bus 142 carries the data between DPMs 140. A second output of the data processing module 122 is received by one or more data processing (DP) modules 150-1, 150-2, . . . , and 150-P (collectively DPMs 150). While a split path is shown after the data processing module 122, a single data path may be used and output to the DPMs 140. A data bus 152 carries the data between DPMs 150 if used.

As can be appreciated, the data descrambling and processing modules 126 and 130 may adjust for delays between scrambling at the scrambling module 118 and descrambling performed by data descrambling and processing modules 126 and 130.

Spurious signals present in the data buses 112, 124, 142 and/or 152 may couple directly or via clock lines or power and ground lines (both not shown) to sensitive analog signals. Maintaining scrambling as described herein can help prevent discrete spurious tones or harmonically related spurious outputs from corrupting the output of the DAC modules 134.

Figure 5:
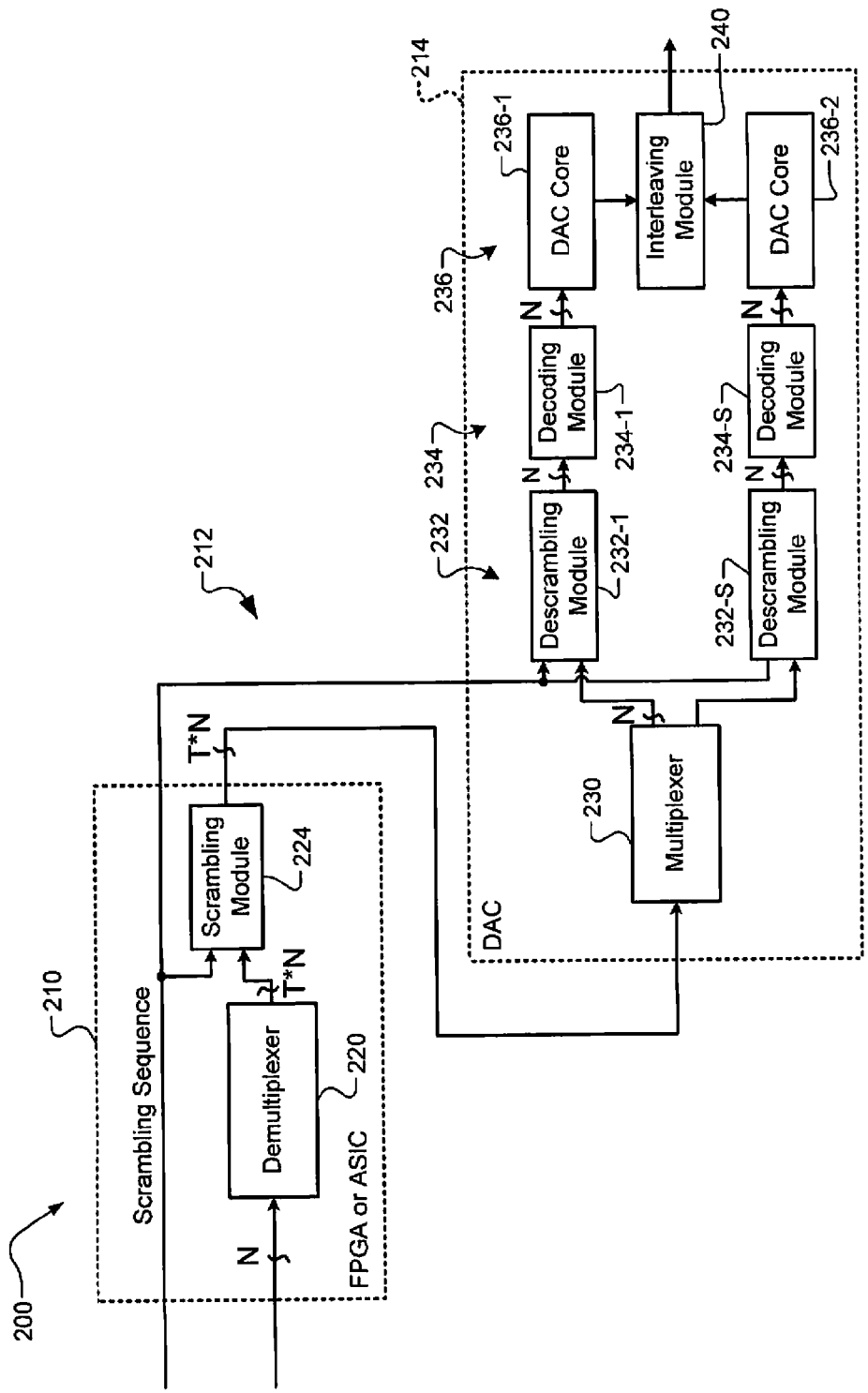
FIG. 5 is a functional block diagram of another exemplary digital to analog converter according to the present disclosure.

Referring now to FIG. 5, another exemplary DAC implementation is shown. A system 200 includes a circuit 210 such as FPGA, ASIC or other circuit that is coupled by a data bus 212 to a DAC 214. The circuit 210 includes a demultiplexer 220 that receives N data streams at a first predetermined rate. The demultiplexer 220 demultiplexes the N data streams into T parallel data streams. Each of the data streams operates at 1/T of the first predetermined rate.

For example only, the first predetermined rate may be 4.6 Gbps and T may be equal to 4. Therefore, each of the parallel data streams operates at ¼ of the DAC update rate for a maximum speed of 1.15 Gbps on each digital input pin.

An output of the demultiplexer 220 is input to a scrambling module 224. The scrambling module 224 may also receive a scrambling sequence. For example only, the scrambling module 224 may include T*N logic gates such as an exclusive OR (XOR) gate. The data bus 212 supplies parallel data streams to a multiplexer 230 of the DAC 214. The multiplexer 230 may be a T:S multiplexer. For example only, when T=4 and S=2, the demultiplexer 230 may be a 4:2 demultiplexer.

Outputs of the multiplexer 230 are received by descrambling modules 232-1 and 232-2 (collectively descrambling modules 232). In some implementations, the descrambling modules 232-1 and 232-2 comprise XOR logic gates. Outputs of the descrambling modules 232 are input to decoders 234-1, respectively. Outputs of the decoders 234 are input to DAC modules 236-1 and 236-2 (collectively DAC modules 236). For example only, the decoders 234 may comprise binary-to-thermometer decoders. Outputs of the DAC modules 236 are input to an interleaving module 240. As can be appreciated, the ordering of the descrambling modules 232 and decoders 234 can be reversed from that shown in FIG. 5.

In use, scrambled digital data is output by the circuit 210 and transmitted to the DAC 214. Once received by the DAC 214, the data streams are multiplexed into high speed data streams that drive each of the DAC modules 236. The multiplexed data is still scrambled. The pseudorandom spreading sequence is provided to the descrambling modules along with the scrambled data. This prevents on-chip coupling from introducing harmonically related spurious signals in the analog output.

Referring now to FIG. 6, a system 300 includes a circuit 310 such as a FPGA, ASIC or other circuit connected by a data bus 312 to a DAC 314. In some implementations, the circuit 310 and the DAC 314 are separate integrated circuits. N parallel data streams are each scrambled by a scrambling module 318 associated with the circuit 310. The scrambling module 318 may perform scrambling based on a scrambling sequence. For example only, the scrambling module 318 can include N exclusive OR (XOR) logic gates that scramble the N parallel data streams and the scrambling sequence, although other types of scrambling may be performed. The scrambling module 318 de-correlates the signals on the data bus 312 from a desired output signal to reduce spurious outputs.

The N scrambled parallel data streams and the scrambling sequence are output to drivers 338 and 340. In some implementations, the drivers 338 and 340 comprise differential signal drivers. Outputs of the drivers 338 and 340 are transferred by the data bus 312 to receivers 342 and 344 associated with the DAC 314 that convert the signals to single ended signals. The differential signal drivers may employ a differential signaling such as low voltage differential signals (LVDS), Pseudo (or Positive) Emitter Coupled Logic (PECL) signals, differential high speed transceiver logic (HSTL) signals, or other suitable differential signaling approaches.

The signals are processed by a first data processing module 322. A data bus 324 is connected to an output of the first data processing module 322 and includes M parallel data streams. Data on the data bus 324 remains scrambled. M may be an integer equal to or different than the input bus width N. The scrambling is maintained on one or more internal data buses of the DAC 314 and may be received by zero or more additional processing modules (for example, see FIG. 4). The data is received at data processing modules 326 and 330 that process and descramble the data as it is used. Outputs of the data processing modules 326 and 330 are input to a DAC module 334.

A similar problem exists in analog-to-digital converters. The on-chip digital data buses may have spectral contents which are highly correlated with the input signal. Undesired coupling has the potential to create harmonic distortion products. Maintaining data scrambling through various digital processing modules may reduce the undesirable affects of any coupling.

Referring now to FIG. 7, a similar approach can be used in analog to digital converter (ADC) applications. A system 350 comprises an ADC module 354 that receives an analog input and that outputs M parallel data streams to a scrambling module 356. The scrambling module 356 scrambles and outputs the M parallel data streams to one or more data processing modules 358 (arranged in series or parallel). The one or more data processing modules 358 output a scrambled ADC output on a data bus 364 to another circuit (not shown). Likewise, the scrambling sequence is also output on the data bus 364 via a delay module 360, which allows alignment of the scrambling sequence when descrambling is performed at the other circuit. The scrambled ADC output passes through one or more data processing modules of the other circuit before being descrambled as shown above.

Spectral content of the signals on the data buses (the input buses and multiplexed buses) is correlated with the RF carriers. In a typical application, the RF carriers that are produced by the DAC are band limited in nature. As a result, the data buses contain significant energy that is concentrated in frequency bands that are related to RF carrier frequencies. In addition, the multiplexer and bus repeaters produce power supply disturbances that have a frequency content that is correlated with the RF carriers. The present disclosure uses spreading sequences to reduce or eliminate harmonic content of digital data by maintaining scrambling through one or more digital processing modules of the DAC or the ADC to avoid problems with coupling from digital buses to analog signals or coupling of harmonics through supply/ground interconnects.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
 a first circuit comprising a demultiplexer that outputs N digital data streams in parallel, and a scrambling module that receives the N digital data streams in parallel and that scrambles the N digital data streams using a scrambling sequence;

a data bus that receives the N scrambled digital data streams and the scrambling sequence; and a second circuit that communicates with the data bus and that comprises:

a first processing module that includes a multiplexer to process the N scrambled digital data streams and that outputs M digital data streams, where M and N are integers greater than one, and where M is different than N;

one or more descrambling and processing modules that receive the M digital data streams, that further process the M digital data streams, and that descramble the M digital data streams based on the scrambling sequence received via the data bus; and a digital to analog converter (DAC) module that receives an output of the one or more descrambling and processing modules.

2. The system of claim 1 wherein the first circuit comprises one of a field programmable gate array (FPGA) and an application specific integrated circuit (ASIC) and wherein the second circuit comprises an integrated circuit.

3. The system of claim 1 wherein the one or more descrambling and processing modules perform thermometer decoding.

4. The system of claim 1 further comprising:

first drivers that receive the N scrambled digital data streams and that output N pairs of differential signals to the data bus; and first receivers that receive the N pairs of differential signals from the data bus and that output the N scrambled digital data streams to the first processing module.

5. The system of claim 4 further comprising:

a second driver that receives the scrambling sequence and that outputs second differential signals to the data bus; and a second receiver that receives the second differential signals from the data bus and that outputs the scrambling sequence to the one or more descrambling and processing modules.

6. The system of claim 5 wherein the N pairs of differential signals and the second differential signals comprise one of low voltage differential signals (LVDS), Pseudo (or Positive) Emitter Coupled Logic (PECL) signals, and differential high speed transceiver logic (HSTL) signals.

7. The system of claim 1, wherein the scrambling module comprises a plurality of XOR logic gates.

8. A method comprising:

outputting N digital data streams in parallel from a demultiplexer;

scrambling the N digital data streams using a scrambling sequence in a first circuit;

transferring the N scrambled digital data streams and the scrambling sequence over a data bus to a second circuit; and processing the N scrambled digital data streams in the second circuit using a multiplexer in a first processing module to generate M digital data streams, where M and N are integers greater than one, and where M is different than N;

further descrambling, based on the scrambling sequence received via the data bus, and processing the M digital data streams generated by the first processing module at the second circuit using one or more descrambling and processing modules; and performing digital to analog conversion on an output of the one or more descrambling and processing modules.

9. The method of claim 8 wherein the first circuit comprises one of a field programmable gate array (FPGA) and an application specific integrated circuit (ASIC) and wherein the second circuit comprises an integrated circuit.

10. The method of claim 8 further comprising:

converting the scrambling sequence and the N scrambled digital data streams into N+1 pairs of differential signals using the first circuit;

transmitting the N+1 pairs of differential signals over the data bus; and converting the N+1 pairs of differential signals to the N scrambled digital data streams and the scrambling sequence.

11. The method of claim 10 wherein the N+1 pairs of differential signals comprise one of low voltage differential signals (LVDS), Pseudo (or Positive) Emitter Coupled Logic (PECL) signals, and differential high speed transceiver logic (HSTL) signals.

12. A system comprising:

a first circuit; and a second circuit, wherein the first circuit comprises:

an analog to digital converter module that receives an analog input and that outputs M digital data streams in parallel;

a scrambling module that receives the M digital data streams in parallel and that scrambles the M digital data streams using a scrambling sequence; and a first processing module that receives the M scrambled digital data streams and that outputs N digital data streams, where N and M are integers greater than one, and where M is different than N;

a data bus that receives the N digital data streams and the scrambling sequence; and wherein the second circuit comprises:

a second processing module that receives the N digital data streams and that processes the N digital data streams using a multiplexer; and one or more descrambling and processing modules that receive an output of the second processing module, that further process the output of the second processing module, and that descramble the output of the second processing module based on the scrambling sequence received via the data bus.

* * * * *

UNITED STATES PATENT AND TRADEMARK OFFICE
CERTIFICATE OF CORRECTION

| | | |
|---|---|---|
| PATENT NO. | : 8,903,092 B2 | Page 1 of 1 |
| APPLICATION NO. | : 12/794323 | |
| DATED | : December 2, 2014 | |
| INVENTOR(S) | : Geir Sigurd Ostrem | |

It is certified that error appears in the above-identified patent and that said Letters Patent is hereby corrected as shown below:

In the Specification:

Column 5, Line 29          Delete "230" and insert --220--

Column 6, Line 20          Delete "334" and insert --314--

Signed and Sealed this
Twelfth Day of May, 2015

Michelle K. Lee
*Director of the United States Patent and Trademark Office*